United States Patent [19]
Zeid

[11] Patent Number: 5,593,034
[45] Date of Patent: Jan. 14, 1997

[54] PRE-RECORDED MEDIA PACKAGE AND DISPLAY

[76] Inventor: Neal R. Zeid, 11869 Featherwood Dr., St. Louis, Mo. 63146

[21] Appl. No.: 453,346

[22] Filed: May 30, 1995

Related U.S. Application Data

[63] Continuation of Ser. No. 159,767, Nov. 30, 1993, abandoned, which is a continuation of Ser. No. 941,156, Sep. 4, 1992, abandoned.

[51] Int. Cl.$^6$ ............................................. B65D 85/672
[52] U.S. Cl. .................... 206/387.11; 40/649; 206/1.5
[58] Field of Search .................... 40/649, 642, 159; 206/232, 309, 1.5, 387.11

[56] References Cited

U.S. PATENT DOCUMENTS

| | | | |
|---|---|---|---|
| 2,297,574 | 9/1942 | McCord | 40/649 X |
| 4,245,741 | 1/1981 | Holkestad | 206/387 |
| 4,381,836 | 5/1983 | Rivkin et al. | 206/387 |
| 4,567,983 | 2/1986 | Morris | 206/387 |
| 4,589,549 | 5/1986 | Hehn | 206/387 |
| 4,813,534 | 3/1989 | Rosen . | |
| 4,865,190 | 9/1989 | Gregerson et al. | 206/309 |
| 4,899,879 | 2/1990 | Rosen . | |
| 4,923,062 | 5/1990 | Hehn et al. | 206/387 |
| 5,226,537 | 7/1993 | Ozeki | 206/459.5 X |
| 5,305,873 | 4/1994 | Joyce | 206/1.5 |

*Primary Examiner*—Bryon P. Gehman
*Attorney, Agent, or Firm*—Haverstock, Garrett and Roberts

[57] ABSTRACT

A reusable package and display construction for holding pre-recorded media is disclosed which comprises an integral one-piece plastic housing having a storage compartment for holding the pre-recorded media and integral with the package construction a display compartment for displaying indicia in a portion of the housing adjacent to the storage compartment wherein the display compartment provides an area in which the indicia may be viewed when the indicia is displayed within the display compartment and the pre-recorded media is held within the storage compartment.

2 Claims, 2 Drawing Sheets

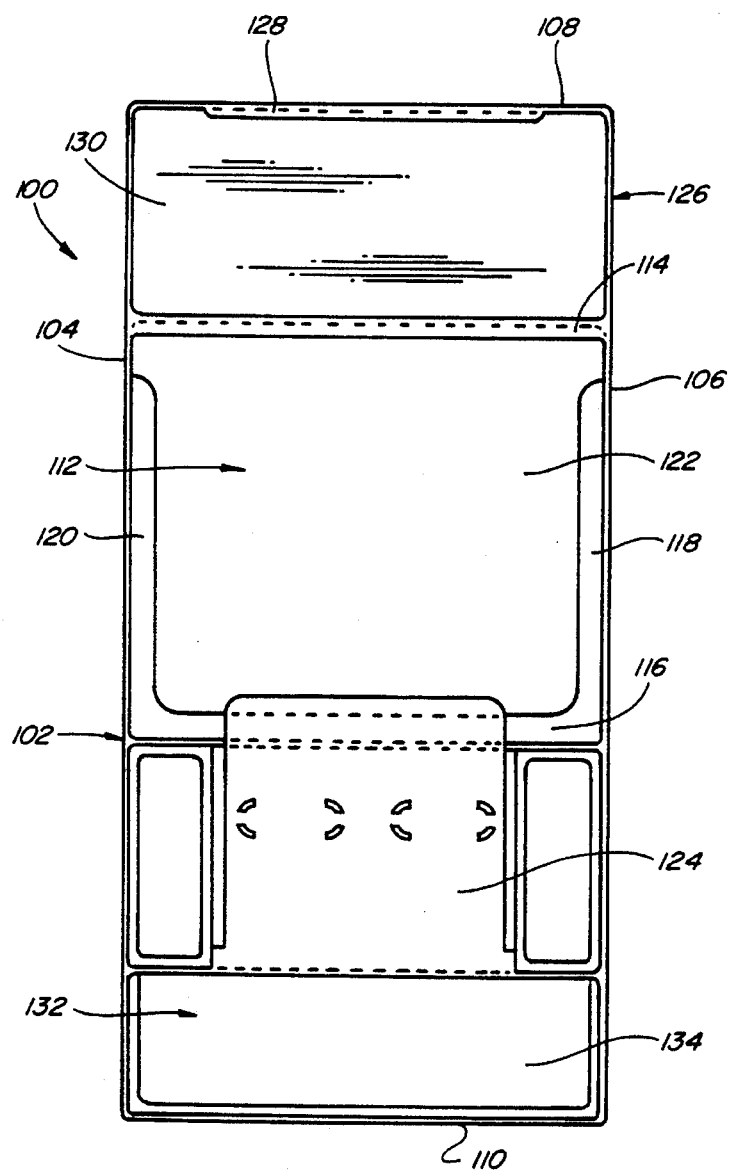
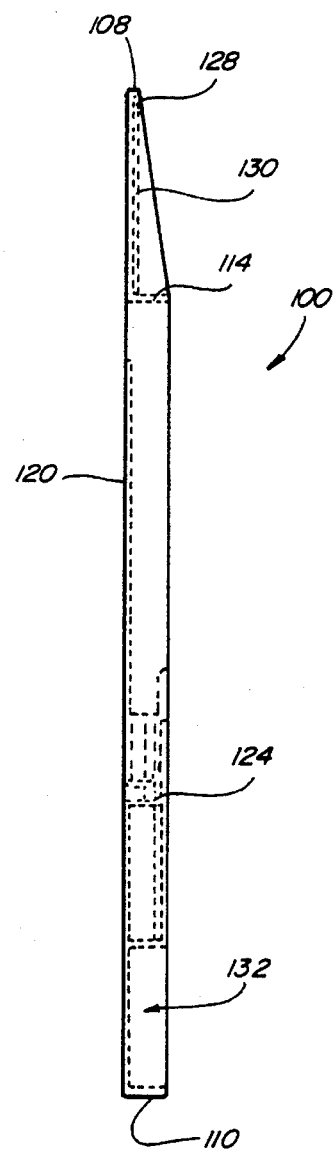
Fig. 4
Fig. 5

PRE-RECORDED MEDIA PACKAGE AND DISPLAY

This is a continuation of application Ser. No. 08/159,767 filed on Nov. 30, 1993 now abandoned which is a continuation of application Ser. No. 07/941,156 filed on Sep. 4, 1992, now abandoned.

BACKGROUND OF THE INVENTION

This invention relates to a pre-recorded media package and display and more particularly to a package and display for use with pre-recorded media with the package housing the pre-recorded media and the package also having an area for displaying other information concerning the pre-recorded media.

In recent years the sales of compact discs (CDs) have increased to the point that they now outsell records, sometimes referred to as L.P.s, and in some cases audio cassettes. Typically, each of the CDs have been packaged in a slender oversized cardboard box in which the CD is housed in one portion of the box and the other portion of the box is empty. The oversized box serves two purposes. One purpose is that it enables the package to be placed in the same rack or rack system or retail fixtures which previously held L.P.s and the other purpose is it is more difficult for a potential shoplifter to remove the CD from the store without being detected. Although this type of packaging was useful other problems associated with its use have now prompted the packaging manufacturers and the pre-recorded media industry to change this type of packaging. One major concern has been that the empty portion of the box is wasteful and results in environmental problems. It is now anticipated that the pre-recorded media industry will require that CDs be packaged and shipped only in a plastic casing which is referred to as a jewel box. However, due to the small size of CDs it is easy to steal the CDs once they are displayed.

In order to overcome this problem various manufacturers have developed special security packages which both hold and lock the CD in place within the specially manufactured package. One example of such a holder including a locking device to retain the CD in the package is disclosed in U.S. Pat. No. 4,589,549. Once a customer selects a particular CD to purchase, the package which contains the CD is brought to the cashier and the cashier unlocks and removes the CD from the package. The package is then reused by inserting and locking another CD therein. The package is also as tall as the previously used oversized box which makes it an acceptable alternative to the oversized box and allows the package to be placed in standard retail fixtures without the need to replace the retail fixtures.

Although these packages are useful one disadvantage associated with their use is that the CD takes up the entire upper portion of the package. Some CDs, because of their small size, are difficult to read at first glance. Therefore, it would be advantageous to have a package display associated with the package which holds the CD in order to alert the customer of the particular CD housed therein or to point out some other attribute of the particular CD housed therein. Additionally, other pre-recorded media, such as cassettes or digital audio tape (DAT), also are of small size and are also difficult to read at first glance. Therefore, it would be also advantageous to have a package display associated with the package which holds the cassette or DAT in order to alert the customer of the particular cassette or DAT housed therein or to point out some other attribute of the particular cassette or DAT housed therein.

SUMMARY OF THE INVENTION

Generally, a reusable package and display construction for holding pre-recorded media comprises an integral one-piece plastic housing having a storage compartment for holding the pre-recorded media and means integral with the package construction for displaying indicia in a portion of the housing adjacent to the storage compartment wherein the displaying means provides an area in which the indicia may be viewed when the indicia is displayed within the displaying means and the pre-recorded media is held within the storage compartment.

Another form of the present invention is a reusable package and display construction for holding pre-recorded media and a display which comprises an integral one-piece plastic housing having a storage compartment formed therein, the storage compartment having an opening for inserting and removing the pre-recorded media and a display compartment formed withing the housing, the display compartment having an opening for inserting and removing the display, the display compartment being adjacent to the storage compartment wherein the display compartment provides an area in which the display may be viewed when the display is positioned within the display compartment and the pre-recorded media is held within the storage compartment.

One object of the present invention is to provide a pre-recorded media package and display which provides a display area for advertising the particular media housed within the package.

Another object of the present invention is to provide a pre-recorded media package and display which is easy to use and inexpensive to manufacture.

A further object of the present invention is to provide a pre-recorded media package and display which allows for easy insertion and removal of advertising for the particular media housed within the package.

A still further object of the present invention is to provide a pre-recorded media package and display which can be molded of plastic material and reused.

These and other objects and advantages of the present invention will become apparent after considering the following detailed specification in conjunction with the accompanying drawings, wherein:

BRIEF DESCRIPTION OF THE DRAWINGS

FIG. 4 is a front plan view of another preferred embodiment of a pre-recorded media package and display of the present invention; and FIG. 5 is a side view of the package and display shown in FIG. 4.

DETAILED DESCRIPTION OF THE PREFERRED EMBODIMENTS

Figure 1:
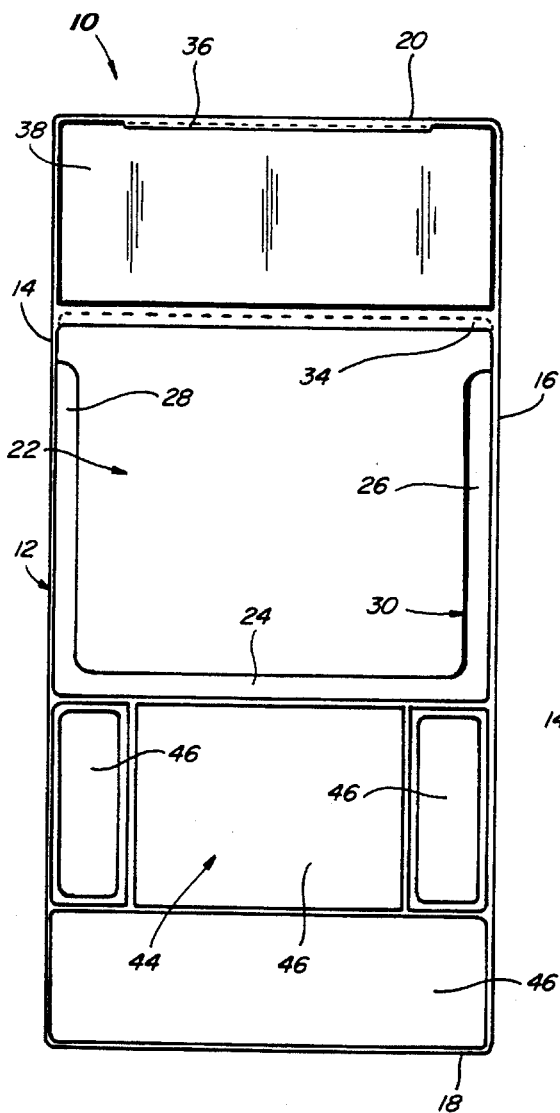
FIG. 1 is a front plan view of a preferred embodiment of a pre-recorded media package and display of the present invention.
Figure 2:
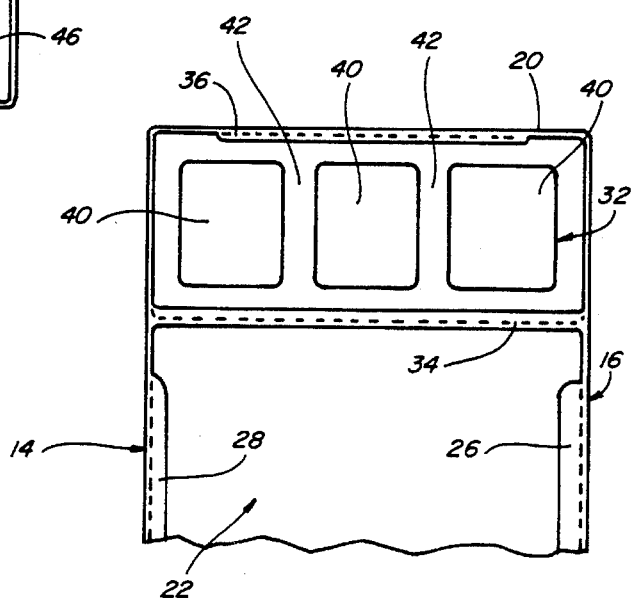
FIG. 2 is a partial front plan view of the package and display shown in FIG. 1 with indicia removed.

Referring now to the drawings, wherein like numbers refer to like items, number 10 identifies a preferred embodiment of a pre-recorded media package and display. The package and display 10, as shown in FIGS. 1 and 2, is formed of a one-piece molded plastic unit. The package and display 10 includes a housing 12 having a pair of side walls 14 and 16 and a pair of end walls 18 and 20. A pre-recorded media storage compartment 22, such as for storing a CD, is formed by a bottom wall 24 and spaced side walls 26 and 28. The walls 24, 26, and 28 form a track 30 into which a CD is placed to be housed and stored.

The package and display 10 further includes an upper portion 32 which is bounded by the side walls 14 and 16, the end wall 20, and a bottom wall portion 34. A top clip portion 36 is formed integrally with the end wall 20. The top clip portion 36 is adapted to receive and hold a display or card 38 or other indicia to inform a consumer of a particular characteristic of the pre-recorded media (not shown) stored within the storage compartment 22. The card 38 which is retained by the clip portion 36 is also able to rest on the bottom wall portion 34. The clip portion 36 and the bottom wall portion 34 loosely entrap the card 36 which is inserted in the clip portion 36. The upper portion 32 has hollow cutout portions 40 which reduce the amount of plastic required for manufacturing the package and display 10. The upper portion 32 also has ribs 42 between the cutout portions 40 which present a surface upon which the card 38 may rest or may be secured. For example, if the card 38 is an adhesive backed card it may be positioned on the ribs 42.

A bottom portion 44 of the package and display 10 is defined between the side walls 14 and 16, the end wall 18, and the bottom wall 24 of the storage compartment 22. The bottom portion 44 has hollow cutout portions 46 which reduce the amount of plastic required for manufacturing the package and display 10 while providing the required height of the package and display 10 for storage within a rack system. Once stored in a rack system, the package and display 10 is able to display both the pre-recorded media stored in the storage compartment 22 and the card 38 stored in the upper portion 32.

Once the package and display 10 has been selected for purchase by a customer, the pre-recorded media which is stored in the storage compartment 22 is removed from the storage compartment 22. Since the package and display 10 is reusable, a similar pre-recorded media may be replaced in the storage compartment 22 and the card 38 in the upper portion 32 will not have to be replaced or changed. However, in the case where different pre-recorded media is placed in the storage compartment 22, the card 38 will be replaced with a different card 38. The old card 38 is removed by sliding it out from between the clip portion 36 and the bottom wall portion 34 and inserting the new card 38 by sliding it in between the clip portion 36 and the bottom wall portion 34. It should be understood that the upper portion 32 serves as an area or surface in which or upon which other indicia, such as adhesive backed labels, may be placed for display purposes. Once such labels serve their useful purpose that may be removed or other labels may be placed over them. Additionally, the card 38 may be inserted into the clip portion 36 to cover the label.

Figure 3:
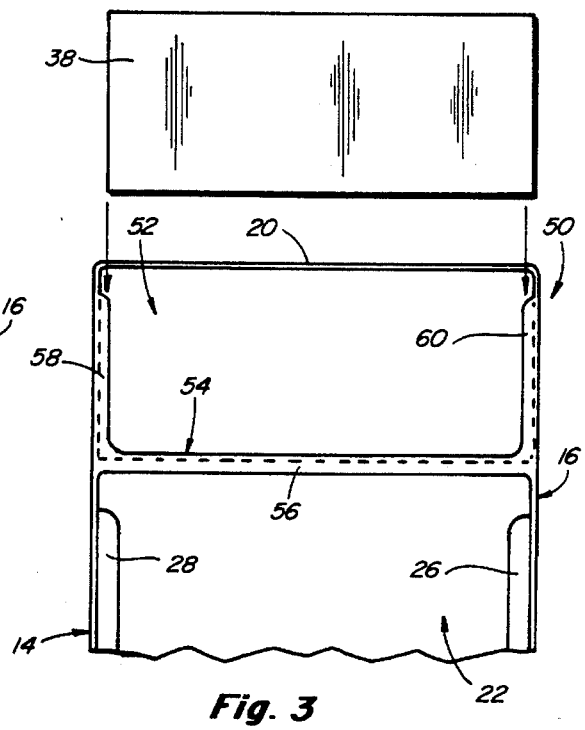
FIG. 3 is a partial front plan view of another preferred embodiment of a pre-recorded media package and display of the present invention.

Referring now to FIG. 3, number 50 identifies another preferred embodiment of the the pre-recorded media package and display. The package and display 50 is similar to the package and display 10 except that it has a different upper portion 52. The upper portion 52 includes a display storage compartment 54, such as for storing the card 38, which is formed by a bottom wall 56 and spaced apart side walls 58 and 60 which are connected by the bottom wall 56. The walls 56, 58, and 60 form a track into which the card 38 is placed to be stored. The storage compartment 22 and the bottom portion 46 is similar to that of package and display 10 and much of this detail has not been shown in FIG. 3.

The procedure for using package and display 50 is similar to that of package and display 10. Once the customer selects the particular pre-recorded media to be purchased, the package and display 50 is taken to the cashier and the pre-recorded media which is stored in the storage compartment 22 is removed from the storage compartment 22. Since the package and display 50 is reusable, a similar pre-recorded media may be replaced in the storage compartment 22 and the card 38 in the upper portion 52 will not have to be replaced or changed. However, in the case where different pre-recorded media is placed in the storage compartment 22, the card 38 will be replaced with a different card 38. The old card 38 is removed by sliding it out from display storage compartment 54 and sliding the new card 38 into the display storage compartment 54.

Referring now to FIGS. 4 and 5, number 100 identifies another preferred embodiment of a package display for pre-recorded media. The package display 100 is formed of a one-piece molded plastic unit. The package display 100 includes a housing 102 having a pair of side walls 104 and 106 and a pair of end walls 108 and 110. A pre-recorded media storage compartment 112, such as for storing a CD, is formed by a top wall 114 and a bottom wall 116 and spaced side walls 118 and 120. The storage compartment 112 further includes a movable back wall portion 122. In order to lock the pre-recorded media, such as a CD in place, a locking mechanism 124, such as described and disclosed in U.S. Pat. No. 4,589,549, may be used. A CD is placed in the storage compartment 112 by unlocking the locking mechanism 124 and sliding the CD in between the spaced side walls 116 and 118 and the movable back wall portion 120.

The package display 100 further includes an upper portion 126 which is bounded by the side walls 104 and 106, the end wall 108, and the top wall 114. A top clip portion 128 is formed integrally with the end wall 108. The top clip portion 128 is adapted to receive and hold a card 130 or other indicia to inform a consumer of a particular characteristic of the enclosed pre-recorded media. The card 130 which is retained by the clip portion 128 is also able to rest on the top wall 114. The clip portion 128 and the top wall 114 loosely entrap the card 130 which is inserted in the clip portion 128.

A bottom portion 132 of the package display 100 is defined between the side walls 104 and 106, the end wall 110, and the locking mechanism 124. The bottom portion 132 has a hollow cutout portion 134 which reduces the amount of plastic required for manufacturing the package display 100 while providing the required height of the package display 100 for storage within a rack system.

Once the package display 100 has been selected for purchase by a customer, the pre-recorded media which is secured in the storage compartment 112 is removed by unlocking the locking mechanism 124. Since the package display 100 is reusable, a similar pre-recorded media may be replaced in the storage compartment 112 and the indicia in the upper portion 126 will not have to be replaced or changed. However, in the case where different pre-recorded media is placed in the storage compartment 112, the card 130 will require replacement with other indicia or cards. The card 130 is removed by sliding it out from between the clip portion 128 and the top wall 114 and inserting the new indicia by sliding it in between the clip portion 128 and the top wall 114.

It should be understood that the package and display 100 can also be constructed with the upper portion 52 having the display storage compartment 54 which was described in conjunction with FIG. 3. The upper portion 126 of package and display 100 would be modified to remove the clip portion 128 and include the display storage compartment 54.

Although the preferred embodiments have been shown to house CDs, it is also contemplated and anticipated that other pre-recorded media, such as cassettes, DATs, digital compact cassettes (DCC), laser discs, video game cartridges, floppy discs, computer discs such as CD ROMs, and video tapes, be housed in the above disclosed and described preferred embodiments of the pre-recorded media package and display. The size of the housing and storage compartment must be adjusted according to the size of the pre-recorded media to be stored therein.

From all that has been said, it will be clear that there has thus been shown and described herein a package display for pre-recorded media which fulfills the various objects and advantages sought therefor. It will be apparent to those skilled in the art, however, that many changes, modifications, variations, and other uses and applications of the subject package display for pre-recorded media are possible and contemplated. All changes, modifications, variations, and other uses and applications which do not depart from the spirit and scope of the invention are deemed to be covered by the invention, which is limited only by the claims which follow.

What is claimed is:

1. A reusable package and display construction for storing a pre-recorded media and displaying a card, the construction comprising:

a plastic housing having a storage compartment;

a card having a length and a height; and a display compartment for displaying the card, the display compartment comprising a pair of side walls, an end wall, a bottom wall portion, and a top clip portion formed integrally with the end wall, the top clip portion adapted to receive and hold the card, and the top clip portion extending along substantially the entire end wall.

2. A reusable package and display construction for storing a pre-recorded media and for displaying a card, the construction comprising:

an integral one-piece plastic housing having a storage compartment;

a card having a length and a height; and a display compartment having a pair of spaced apart sides, an end wall, a bottom wall portion, and a top clip portion extending along substantially the entire end wall, the sides each having a height at least as great as the height of the card and the bottom wall portion has a length at least as great as the length of the card with the clip portion, sides, and bottom wall portion adapted to capture the card and hold the card in place.

* * * * *